US006934390B2

(12) United States Patent
Moskowitz et al.

(10) Patent No.: US 6,934,390 B2
(45) Date of Patent: Aug. 23, 2005

(54) SYSTEM AND METHOD FOR TRANSFERRING ELECTRONIC INFORMATION

(75) Inventors: Paul A. Moskowitz, Yorktown Heights, NY (US); Stephen J. Boies, Mahopac, NY (US); Samuel Dinkin, Austin, TX (US); David P. Greene, Ossining, NY (US); William Grey, Millwood, NY (US); Philip Shi-lung Yu, Chappaqua, NY (US); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 09/892,819

(22) Filed: Jun. 27, 2001

(65) Prior Publication Data

US 2003/0005288 A1 Jan. 2, 2003

(51) Int. Cl.[7] .............................. H04N 7/167; H04L 9/00
(52) U.S. Cl. ....................................... 380/201; 713/156
(58) Field of Search .......................... 380/201; 713/193, 713/160, 156

(56) References Cited

U.S. PATENT DOCUMENTS 4,771,375 A * 9/1988 Beglin et al. ............... 711/111
5,805,699 A * 9/1998 Akiyama et al. ............ 705/58
6,367,019 B1 * 4/2002 Ansell et al. ............... 713/201
6,671,813 B2 * 12/2003 Ananda ...................... 713/202
6,697,944 B1 * 2/2004 Jones et al. ................. 713/168
2002/0007454 A1 * 1/2002 Tarpenning et al. ......... 713/156
2002/0065778 A1 * 5/2002 Bouet et al. ................ 705/57
2002/0099812 A1 * 7/2002 Davis et al. ................ 709/224
2002/0107802 A1 * 8/2002 Philips ........................ 705/51
2003/0159043 A1 * 8/2003 Epstein ....................... 713/176

OTHER PUBLICATIONS

A. Kh. AL Jabri, and A. Kh. Al–Asmari, Secure progressive transmission of compressed images, Aug. 1996, IEEE Transactions on comsumer electronics, vol. 42 No. 3, pp. 504–512.*

* cited by examiner

Primary Examiner—Ayaz Sheikh
Assistant Examiner—Eleni Shiferaw
(74) Attorney, Agent, or Firm—Buckley, Maschoff & Talwalkar LLC; Stephen C. Kaufman (57) ABSTRACT

A system to transfer electronic information includes reception of a command to transmit a file of electronic information. In response to the received command, the file of electronic information is automatically copied to create a copied file of electronic information, the copied file is transmitted, and the file of electronic information is rendered unusable. By rendering the file of electronic information unusable after copying the file, no additional usable copies of the file will remain. As a result, a degree of protection is provided to any copyright interest in the electronic information embodied therein.

15 Claims, 8 Drawing Sheets

| CONSUMER ID 501 | DELIVERY INFORMATION 502 | SUBSCRIPTION TYPE 503 | RETURNED 504 | CERTIFICATE RECEIVED 505 |
|---|---|---|---|---|
| 3B1 | 220.111.842.001 | ROCK MUSIC | R0350, R9193 R4211 | R0350 |
| 99 | JOHNDOE@DOE.COM | MYSTERY NOVELS | MN411 | |
| 1XA | 1-777-666-5555 | GENERAL FICTION | GF363, GF261 | GF363, GF261 |
| 1C | 111 ELM ST NEW TOWN, CT 06060 | ACTION MOVIES | AM1111, AM0114, AM6312, AM50 | AM1111, AM0114, AM50 |

SYSTEM AND METHOD FOR TRANSFERRING ELECTRONIC INFORMATION

BACKGROUND OF THE INVENTION

1. Field of the Invention

The present invention relates to systems for transferring electronic information. More specifically, the present invention concerns a system for transferring a file of electronic information so as to protect the interests of a holder of a copyright in the transferred file.

2. Description of the Related Art

Most artwork, books and music are protected by copyrights. Copyrights are legal rights intended to protect the interests of a copyright holder by allowing a copyright holder to control copying of his copyrighted material.

Controlling copying is essential to protecting the interests of a copyright holder. For example, unauthorized copying decreases the value of copyrighted material to a copyright holder, because every sale of an unauthorized copy is a lost sale to the copyright holder. Also, the existence of unauthorized copies may decrease the rarity and therefore the value of copyrighted material. Moreover, a copyright holder may wish to control copying to ensure that his copyrighted material is not used in an undesirable manner.

In the past, the interests of a copyright holder were somewhat protected by difficulties in creating satisfactory copies of copyrighted material. For example, music or movies experienced a significant loss in quality when copied onto analog tape media. Also, copying bound books required the manually-intensive process of copying and collating each page using a photocopier. In view of these difficulties, consumers usually opted to purchase an authorized copy of copyrighted material rather than to create an unauthorized copy. As a result, unauthorized copies did not significantly affect the market for most copyrighted material.

For example, the Book-of-the-Month Club®, in existence since 1926, periodically sends bound books to subscribers. Unwanted books are returned by the subscribers. Due to the manually-intensive process needed to copy bound books, most subscribers will pay for a desired book instead of copying and returning a desired book. As a result, the Club has continued to remain profitable.

Advances in the use and reproduction of analog and digital files have addressed many of the previous hurdles to unauthorized copying. For example, music and books may be embodied in electronic files and perceived therefrom using electronic devices. These electronic files may be easily copied with modern computing systems such that the copies have little or no perceptible difference in quality from the originals. As a result, the interests of copyright holders have become seriously undermined. Such factors have discouraged electronic versions of the Book-of-the-Month Club®. Specifically, it is believed that electronic copies of music or books delivered to a subscriber are likely to be copied and returned. Accordingly, an electronic version of the Book-of-the-Month Club® might not generate acceptable profits.

In view of these problems, what is needed is an improved system to control copying of material embodied in electronic files.

SUMMARY OF THE INVENTION

In order to address the foregoing needs, the present invention provides a system to transfer electronic information. According to one embodiment, a command to transmit a portion of a file of electronic information is received, and, in response to the received command, the portion of the file of electronic information is automatically copied to create a copied file of electronic information, the copied file is transmitted, and the portion of the file of electronic information is rendered unusable. By rendering the portion of the file of electronic information unusable after copying the file, no additional usable copies of the portion of the file will remain. As a result, a degree of protection is provided to any copyright interest in the electronic information embodied therein.

In certain embodiments of the foregoing aspect, it is determined whether the portion of the file of electronic information should be rendered unusable based on an electronic tag associated with the portion of the file. Such a feature allows certain files to be identified as to be rendered useless if copied, which may be particularly advantageous for files embodying copyrighted material.

In another aspect, the present invention concerns a system to provide a file of electronic information in which a file of electronic information is provided, a copy of a portion of the file of electronic information is received, and a certificate certifying that the portion of the file of electronic information has been rendered unusable is received. The foregoing system may be used to allow a consumer to return electronic files to a distributor, while assuring that the electronic files have been rendered unusable. Again, such an arrangement protects the interests of a holder of a copyright in the returned files. Such an arrangement also enables an electronic book or music subscription service in which an unwanted file containing text, audio, or images may be returned or destroyed by a subscriber in such a way that the service can be assured that unauthorized copies have not been made.

With these and other advantages and features that will become hereafter apparent, a more complete understanding of the nature of the invention can be obtained by referring to the following detailed description and to the drawings appended hereto.

DETAILED DESCRIPTION

Figure 1:
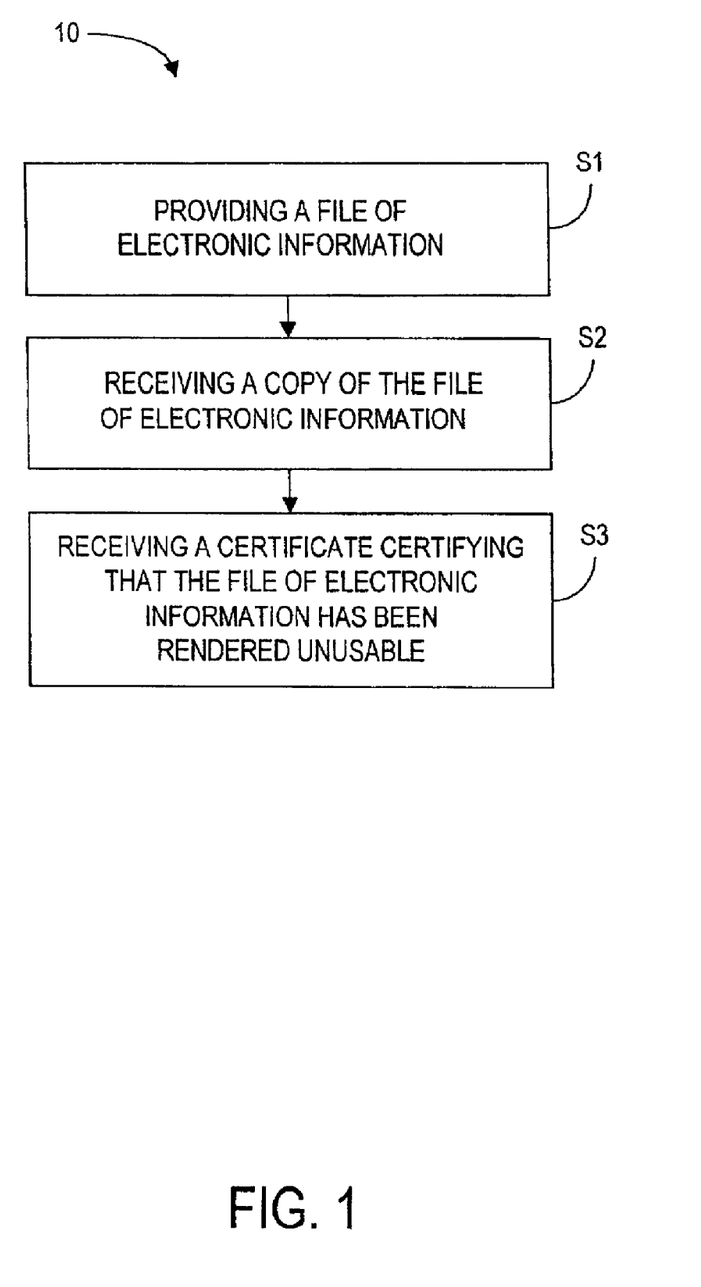
FIG. 1 is a flow diagram of process steps to provide a file of electronic information according to embodiments of the present invention.

FIG. 1 is a flow diagram of process steps 10 to provide a file of electronic information according to embodiments of the present invention. In order to provide an immediate introduction to features of the present invention, process steps 10 will now be described without reference to a particular embodiment. Of course, a complete description of specific hardware and software embodiments of the claimed invention is set forth below.

Initially, in step S1, a file of electronic information is provided. The file may be formatted in any now or later-perceivable format, including .wav, .mp3, .gif, .pdf, .bmp, etc. The file may embody copyrighted information, such as music or a novel.

In some embodiments, the file is provided in step S1 to a consumer based on a subscription. That is, the consumer to whom the file is provided has entered into an agreement with an entity to receive certain information periodically in exchange for payment. In this regard, the file provided in step S1 represents the information to be received by the consumer.

A copy of the file of electronic information is received in step S2. Returning to the subscription embodiment, the copy may be received from the consumer to whom the original file was provided in step S1 if the consumer decides not to keep and pay for the original file. Next, in step S3, a certificate is received certifying that the original file of electronic information has been rendered unusable. In some embodiments, the certificate is also received from the consumer who received the original file. In such a case, and as described in detail below, it is contemplated that the consumer upon copying the original file may generate the received certificate. Such a system assists in determining that the consumer has not kept a usable copy of the file, and therefore protects the interests of a holder of a copyright in any information embodied in the file.

Network Architecture

Figure 2:
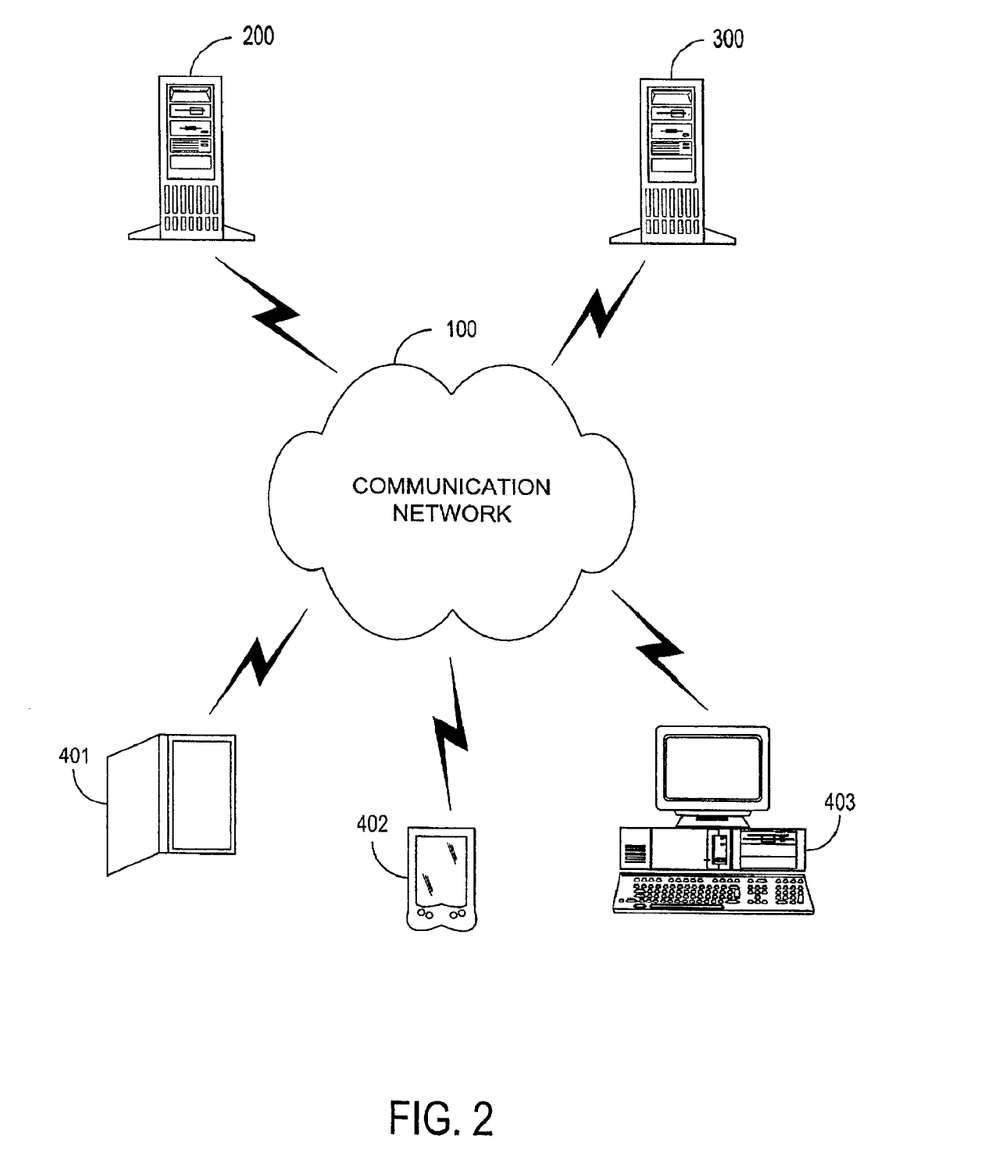
FIG. 2 is a topographic view of a network architecture according to embodiments of the present invention.

FIG. 2 is a topographic view of a network architecture according to embodiments of the present invention. Of course, network architectures other that that shown in FIG. 2 may be used to implement the invention.

FIG. 2 shows communication network 100 in communication with subscription server 200, copyright server 300 and consumer devices 400 to 402. As such, communication network 100 may comprise any number of systems for transferring data, including a local area network, a wide area network, a telephone network, a cellular network, a fiber-optic network, a satellite network, an infra-red network, a radio frequency network, and any other type of network which may be used to transmit information between devices. Additionally, communication network 100 may be used to transmit data using any known transmission protocol, such as Asynchronous Transfer Mode (ATM), Internet Protocol (IP), Hypertext Transfer Protocol (HTTP) and Wireless Application Protocol (WAP). In one embodiment, communication network 100 is the World Wide Web.

Subscription server 200 may comprise a network server or other device capable of performing the functions described herein. Subscription server 200 may control various operations of an entity providing subscription services, such as consumer tracking, inventory tracking, accounting, sales tracking and the like. It should be noted that subscription server 200 may also control distribution of electronic files to consumers on a non-subscription basis. According to one embodiment, subscription server 200 operates to provide a file of electronic information, to receive a copy of the file of electronic information, and to receive a certificate certifying that the file of electronic information has been rendered unusable. Details of one embodiment of subscription server 200 are set forth below with respect to FIG. 3.

Copyright server 300 may also comprise a network server or other computing device. Copyright server 300 may monitor the sale, transmission and use of copyrighted information over communication network 100. In one embodiment, copyright server 300 receives a certificate from a consumer device certifying that a file of electronic information has been rendered unusable after the file is copied and the copied file is transmitted from the consumer device to subscription server 200.

Consumer devices 400 to 402 comprise an electronic book, a Personal Digital Assistant (PDA) and a workstation, respectively. Consumer devices 400 to 402 operate in accordance with one embodiment to receive a command to transmit a file of electronic information, and, in response to the command, to automatically copy the file of electronic information so as to create a copied file of electronic information, to transmit the copied file, and to render the file of electronic information unusable. In this regard, a consumer device according to the invention may be any device or devices capable of receiving, processing and transmitting files of electronic information. Consumer devices 400 to 402 may also be used by a consumer to perceive received files of electronic information. For example, consumer device 400 may be used to view files formatted in an electronic book format, and consumer device 401 may be used to listen to audio files.

In other embodiments, the elements of FIG. 2 are connected differently than as shown. For example, some or all of the elements may be connected directly to one another. Of course, embodiments of the invention may include elements that are different from those shown.

It should be noted that the devices shown in communication with each other need not be constantly exchanging data. Rather, communication may be established when necessary and severed at other times or always available but rarely used to transmit data. Moreover, although the illustrated communication links between the components of FIG. 2 appear dedicated, it should be noted that each of the links may be shared by other components.

Subscription Server

Figure 3:
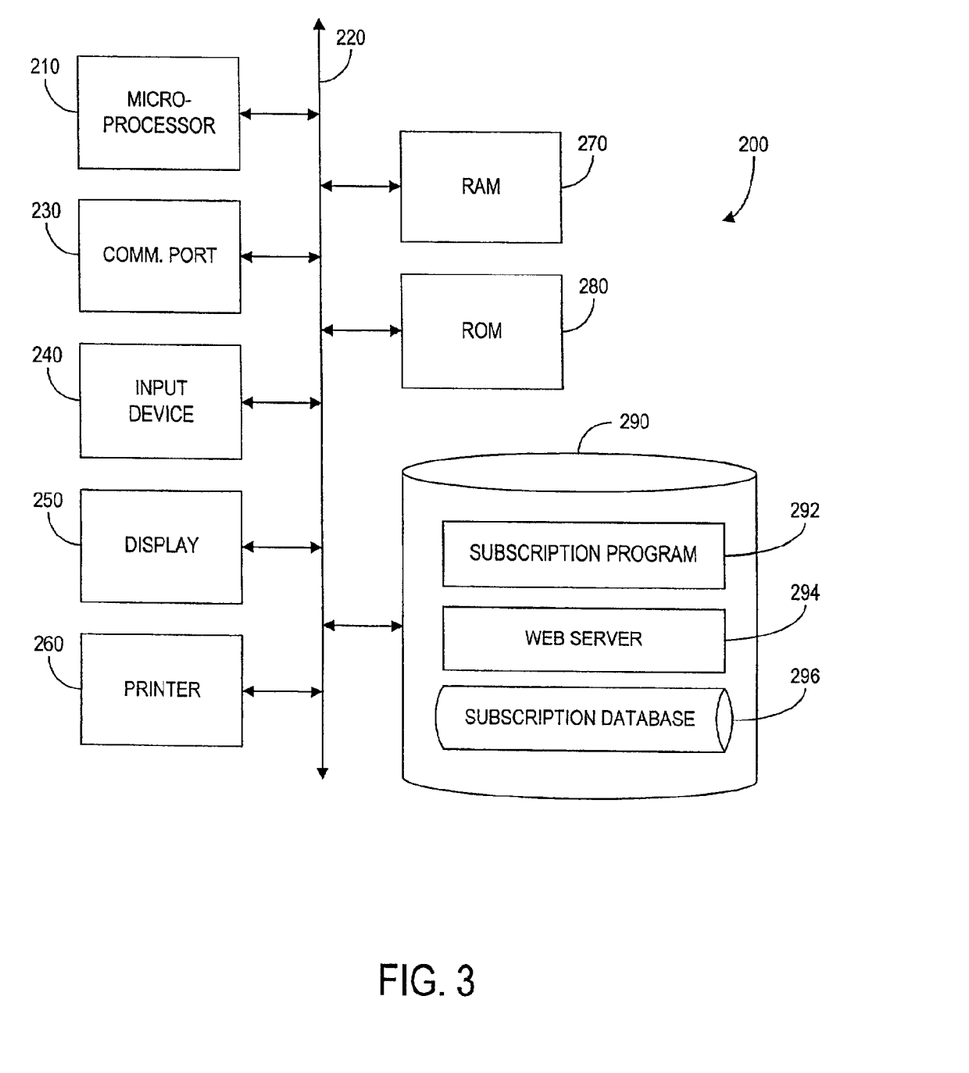
FIG. 3 is a block diagram of an internal architecture of a subscription server according to embodiments to the present invention.

FIG. 3 is a block diagram of the internal architecture of subscription server 200 according to one embodiment of the invention. As illustrated, subscription server 200 includes microprocessor 210 in communication with communication bus 220. Microprocessor 210 may be a Pentium™, RISC™-based, or other type of processor and is used to execute processor-executable process steps so as to control the components of subscription server 200 to provide functionality according to embodiments of the present invention.

Also in communication with communication bus 220 is communication port 230. Communication port 230 is used to transmit data to and to receive data from devices external to subscription server 200. Communication port 230 is therefore preferably configured with hardware suitable to physically interface with desired external devices and/or network connections. In one embodiment, files of electronic information are transmitted to and received from consumer devices over communication port 230.

Input device 240, display 250 and printer 260 are also in communication with communication bus 220. Any known input device may be used as input device 240, including a keyboard, mouse, touch pad, voice-recognition system, or any combination of these devices. Input device 240 may be used by an entity to input file information, consumer information, subscription information, and other information to subscription server 200. Of course, such information may also be input to subscription server 200 via communication port 230. Commands for controlling operation of subscription server 200 may also be input using input device 240, such as commands to transmit a file, to receive a file, or to output a listing of returned files.

Such a listing may be output to display 250, which may be an integral or separate CRT display, flat-panel display or the like. Display 250 is generally used to output graphics and text to an operator in response to commands issued by microprocessor 210. Printer 260 may also output graphics and text, but in hardcopy form using ink-jet, thermal, dot-matrix, laser, or other printing technologies.

RAM 270 is connected to communication bus 220 to provide microprocessor 210 with fast data storage and retrieval. In this regard, processor-executable process steps being executed by microprocessor 210 are typically stored temporarily in RAM 270 and executed therefrom by microprocessor 210. ROM 280, in contrast, provides storage from which data can be retrieved but to which data cannot be stored. Accordingly, ROM 280 is used to store invariant process steps and other data, such as basic input/output instructions and data used during system boot-up or to control communication port 230. It should be noted that one or both of RAM 270 and ROM 280 may communicate directly with microprocessor 210 instead of over communication bus 220.

Data storage device 290 stores, among other data, subscription server program 292 of processor-executable process steps. Microprocessor 210 executes process steps of subscription program 292 in order to control subscription server 200 to provide a file of electronic information in accordance with the present invention. More specifically, the process steps of subscription program 292 may be executed by microprocessor 210 to provide a file of electronic information, to receive a copy of the file of electronic information, and to receive a certificate certifying that the file of electronic information has been rendered unusable. As a result, distribution of the electronic information can be controlled to some degree.

The process steps of subscription program 292 may be read from a computer-readable medium, such as a floppy disk, a CD-ROM, a DVD-ROM, a Zip™ disk, a magnetic tape, or a signal encoding the process steps, and then stored in data storage device 290 in a compressed, uncompiled and/or encrypted format. In alternative embodiments, hard-wired circuitry may be used in place of, or in combination with, processor-executable process steps for implementation of the processes of the present invention. Thus, embodiments of the present invention are not limited to any specific combination of hardware and software.

Data storage device 290 also stores processor-executable process steps of World Wide Web ("Web") server 294. The process steps may be executed by microprocessor 210 to transmit data to and receive data from Web clients, such as Web browsers, over the Web.

Subscription database 296 is also stored in data storage device 290 and includes information for tracking consumer subscriptions. For example, subscription database 296 may include records specifying a consumer, types of files to which the consumer has subscribed, information for delivering files to the consumer, files returned by the consumer, and certificates certifying that transmitted files were rendered unusable by the consumer. This information will be described in more detail with respect to FIG. 5. Of course, subscription database may include information other than that described above.

Stored in data storage device 290 may also be other unshown elements that may be necessary for operation of subscription server 200, such as other applications, other data files, an operating system, a database management system and "device drivers" for allowing microprocessor 210 to interface with devices in communication with communication port 230. These elements are known to those skilled in the art, and are therefore not described in detail herein.

Consumer Device

Figure 4:
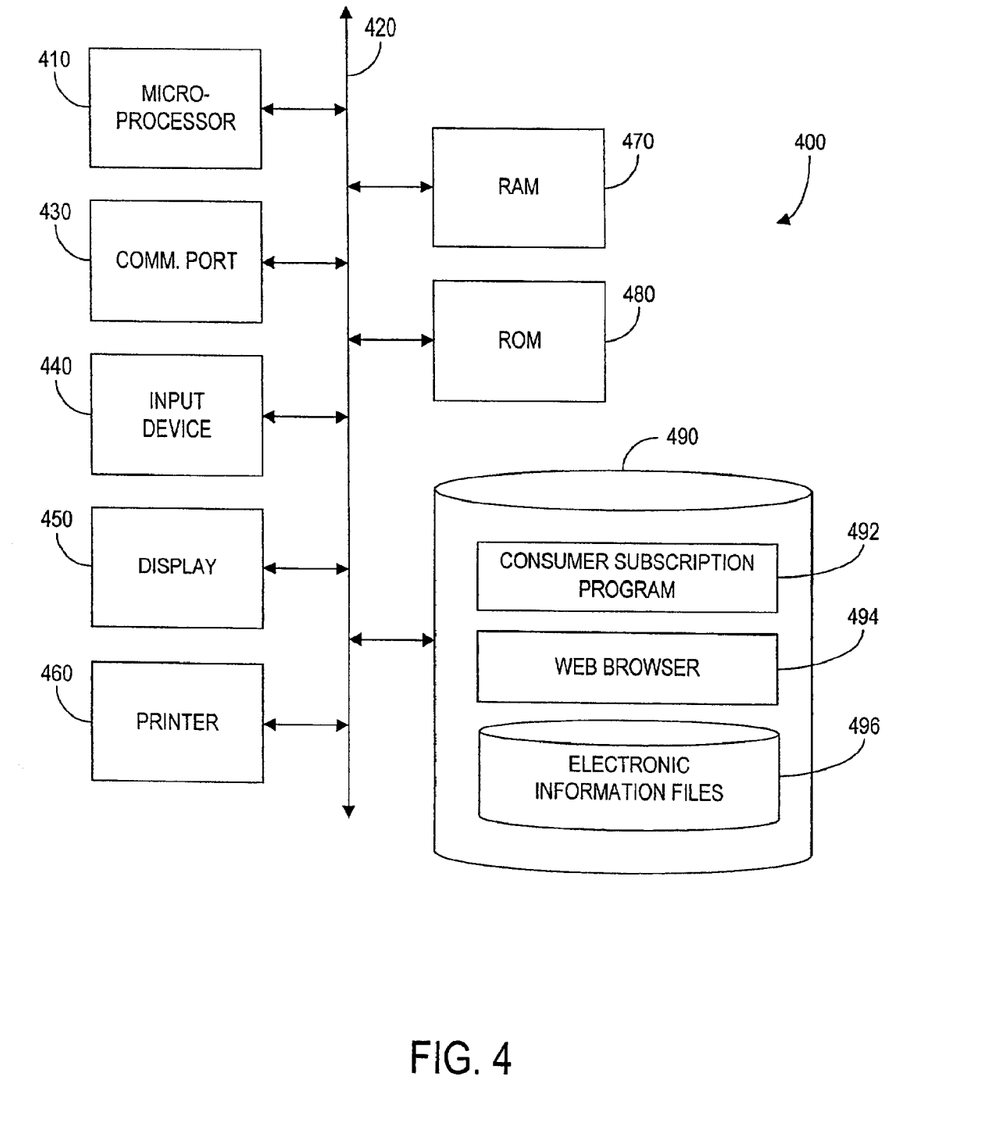
FIG. 4 is a block diagram of an internal architecture of a consumer device according to embodiments to the present invention.

FIG. 4 illustrates several components of consumer device 400 according to one embodiment of the invention. The components may comprise any of the specific examples set forth above with respect to identically-named components of subscription server 200. Of course, specific functions performed by the components may differ from the functions performed by the identically-named components.

For example, communication port 430 may be used to receive files of electronic information, to transmit copies of such files, and to transmit certificates certifying that a copied file has been rendered unusable. Input device 440 may be used by a consumer to input commands to return a received file of electronic information or to operate an application for perceiving the electronic information. In this regard, electronic information comprising a book may be perceived by displaying pages of the book on display 450, or by printing the pages using printer 460. In a case that the electronic information represents music, the information may be perceived by operating an application for playing the music through speakers (not shown). Input device 440, display 450 and printer 460 may also be used in conjunction with other applications provided by consumer device 400 which are unrelated to the present invention.

Data storage device 490 stores consumer subscription program 492 of processor-executable process steps. The process steps of consumer subscription program 492 may be executed by microprocessor 410 so as to control consumer device 400 to receive a command to transmit a file of electronic information and, in response to the command, to automatically copy the file of electronic information to create a copied file of electronic information, to transmit the copied file, and to render the file of electronic information unusable. The process steps of consumer subscription program 492 may be read from a computer-readable medium, such as a floppy disk, a CD-ROM, a DVD-ROM, a Zip™ disk, a magnetic tape, or a signal encoding the process steps, and then stored in data storage device 490 in a compressed, uncompiled and/or encrypted format. In alternative embodiments, hard-wired circuitry may be used in place of, or in combination with, processor-executable process steps for implementation of the processes of the present invention.

Also stored in data storage device 490 are processor-executable steps of Web browser 494. The process steps of Web browser 494 may be executed by microprocessor 410 to allow consumer device 400 to send and receive files over the Web. More specifically, Web browser 494 allows consumer device 400 to transmit information to and to receive information from a device executing process steps of a Web server, such as subscription server 200.

Electronic information files 496 are also stored in data storage device 490. As described above, some or all of electronic information files 496 may be received from subscription server 200 in accordance with a subscription or otherwise. As also described, electronic information files 496 may include files of copyrighted information of which an associated copyright holder would like to prevent copying.

Data storage device 490 may also store application files, data files and system files other than those shown in FIG. 4. These files may be used to provide a consumer with functionality other than that provided by the present invention.

Subscription Database

Figure 5:
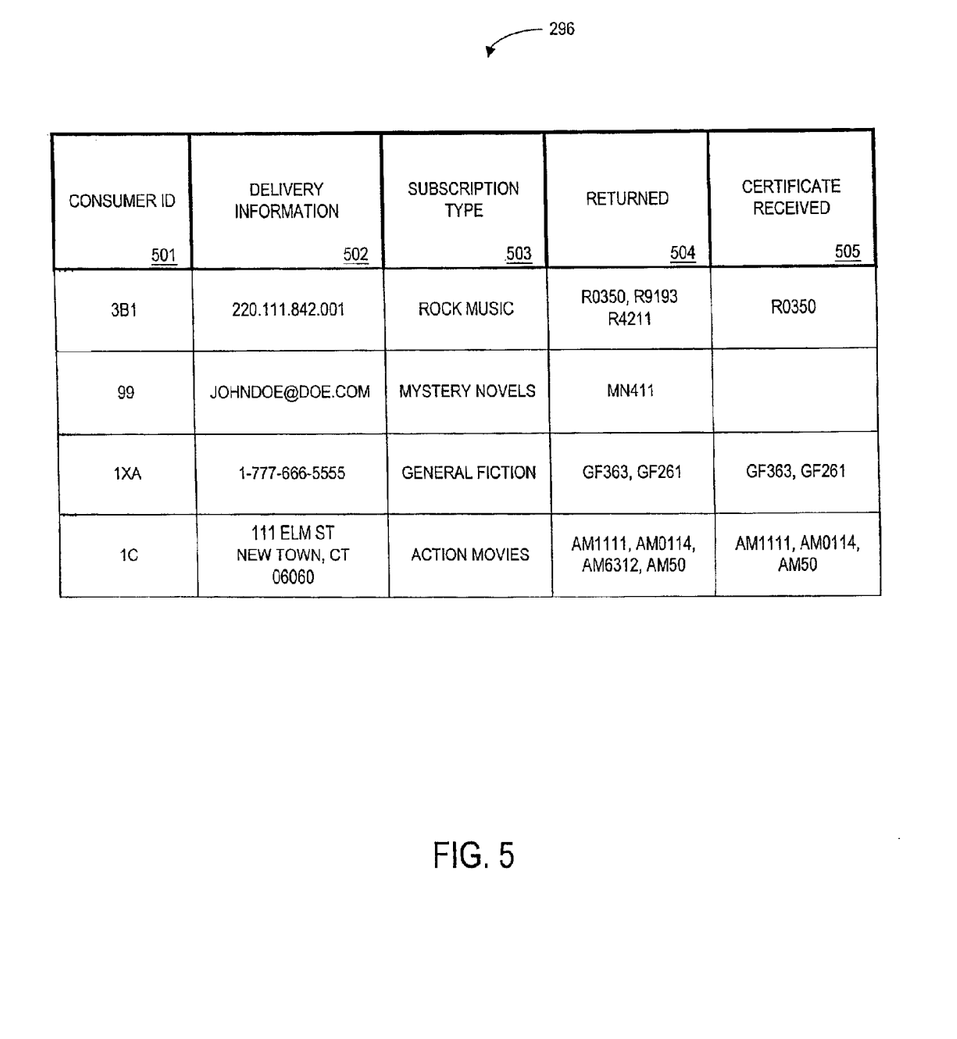
FIG. 5 is a representative view of a tabular portion of a subscription database according to embodiments of the present invention.

A tabular representation of a portion of subscription database 296 is shown in FIG. 5. The information stored in subscription database 296 may be entered by an employee through input device 240 of subscription server 200, or may be received from a consumer device over communication network 100. As previously mentioned, the information stored in subscription database 296 may be used to determine what electronic files to provide to a consumer, to determine how to provide the files in accordance with a subscription, and to track returned files.

Subscription database 296 includes several records and associated fields. The fields include consumer ID field 501, delivery information field 502, subscription type field 503, returned field 504, and certificate received field 505. Consumer ID field 501 of a record specifies a consumer who is a party to a subscription agreement with the entity operating subscription server 200. The subscription agreement may be entered into by any known manner.

Delivery information field 502 of a record provides information usable to deliver files of electronic information to an associated consumer. As shown, delivery information field 502 may include an IP address, an e-mail address, a telephone number, and a postal address. Of course, delivery information other than that shown in FIG. 5 may be used in accordance with the present invention, and some consumers may be associated with more than one entry in delivery information field 502.

Subscription type field 503 specifies a particular type of files to which an associated consumer subscribes. For example, subscription server 200 may offer several types of subscriptions from which a consumer may choose according to the consumer's tastes. Accordingly, subscription server 200 provides files of electronic information to the consumer corresponding to the chosen subscription type. Since the files provided in accordance with this example are not specifically selected by the consumer, the consumer may occasionally decide to return a file which he does not want to purchase.

Returned files are tracked using returned field 504. This field identifies those files that have been returned by an associated consumer. In one embodiment, the returned files are copies of original files provided to the consumer by subscription server 200. As described with respect to process steps 10, a returned copy of a file may be accompanied by a certificate certifying that the original file has been rendered unusable. Such a certificate is intended to ensure that a single original file is not converted to two or more usable files. Certificate received field 505 is used to indicate for which returned files a certificate has been received.

It is contemplated that subscription database 296 may include many more records than those shown and that each record may include associated fields other than those illustrated in FIG. 5. In this regard, database 296 may include fields identifying copyright holders associated with particular files of electronic information, files which embody copyrighted information, or other information. Moreover, database 296 may include records representing subscriptions offered by more than one entity, and non-subscription-based transactions such as a traditional sale. It should also be noted that the tabular illustration and accompanying description of subscription database 296 merely represents relationships between stored information. A number of other arrangements may be employed besides those suggested.

File Structure

Figure 6:
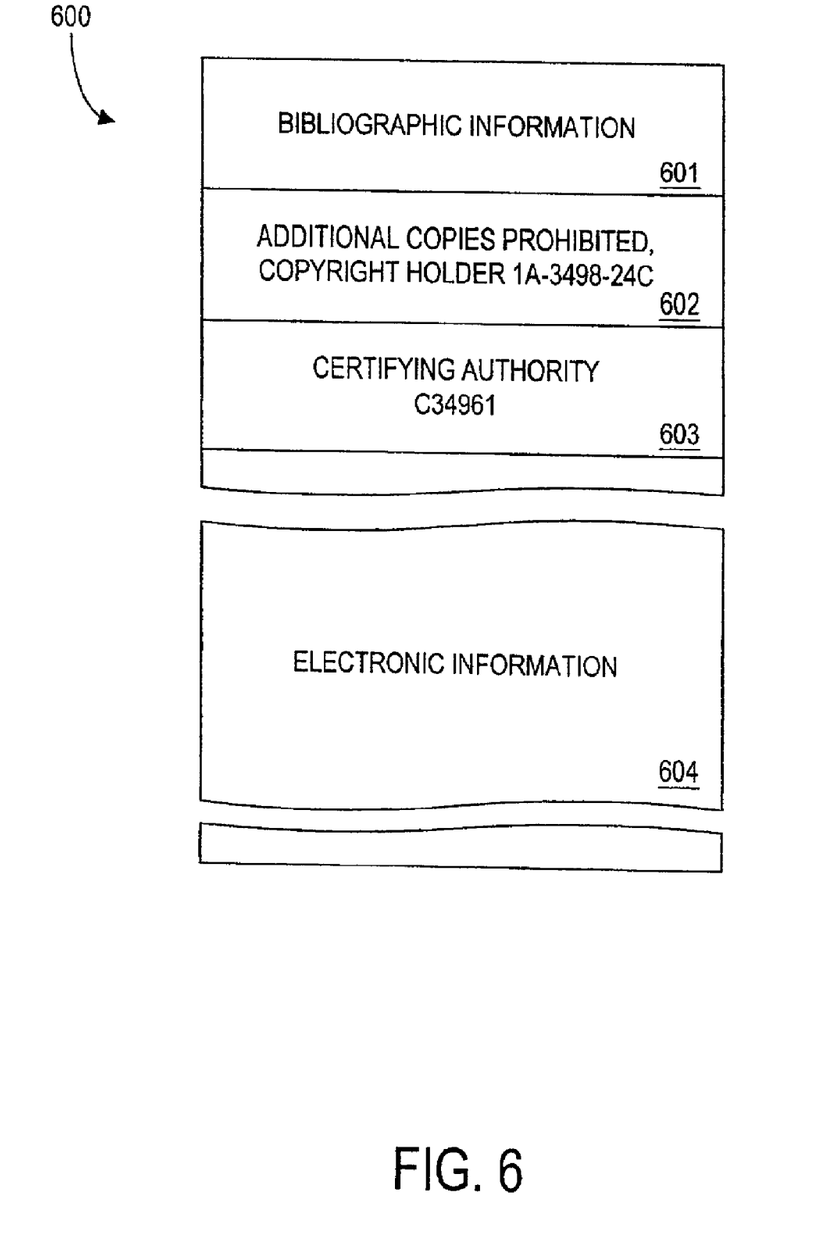
FIG. 6 is a representative view of an electronic file according to embodiments of the present invention.

FIG. 6 is a representative view of electronic information file 600 according to one embodiment of the present invention. Electronic information file 600 may be transmitted by subscription server 200 to consumer device 400 and stored in data storage device 490 along with electronic information files 496. Electronic information file 600 may be stored in subscription server 200 prior to the transmission or in a data repository or other device in communication with subscription server 200.

As shown, electronic information file 600 includes several data segments. Segment 601 comprises a title or album name, chapter titles or song titles, and/or other bibliographic information identifying electronic information file 600. Segment 602 includes an electronic tag specifying a copyright holder in information embodied by file 600 as well as any copying restrictions imposed by the copyright holder. Of course, several copyright holders may be specified in segment 602. In one embodiment, a consumer issues a command to transmit file 600 back to subscription server 200 and, in response, process steps of consumer subscription program 492 are executed by microprocessor 410 to determine, based on segment 602, that file 600 should automatically be copied and rendered unusable.

Segment 603 specifies a certifying authority deemed by the copyright holder to be a trusted authority. Again, more than one certifying authority may be specified in segment 603. In one embodiment, the specified certifying authority is associated with a device such as certification server 300.

Certifying authority information may be used in several ways in accordance with the present invention. For example, consumer subscription program 492 may include different process steps to automatically copy and render a file unusable that are approved by different certifying authorities. Accordingly, upon receiving a command to transmit file 600 back to subscription server 200, those process steps that have been approved by a certifying authority specified in segment 603 are identified and executed. In another example, a device associated with the specified certifying authority, such as certification server 300, may be contacted by consumer device 400 after the command is received and may transmit the appropriate process steps to consumer device 400. In addition to or alternatively to either of the above examples, the associated device may be contacted after copying and rendering file 600 unusable to obtain a certificate certifying that file 600 has been copied and rendered unusable. The certificate may then be transmitted to the copyright holder specified in segment 602, to subscription server 200, and/or to another entity to indicate that no additional usable copies of file 600 have been created.

Electronic information 604 of file 600 may include copyrighted or non-copyrighted information such as images, text, audio, software, or other information. The information may be in any form perceivable using known or hereafter known systems.

Specific Example

Figure 7A:
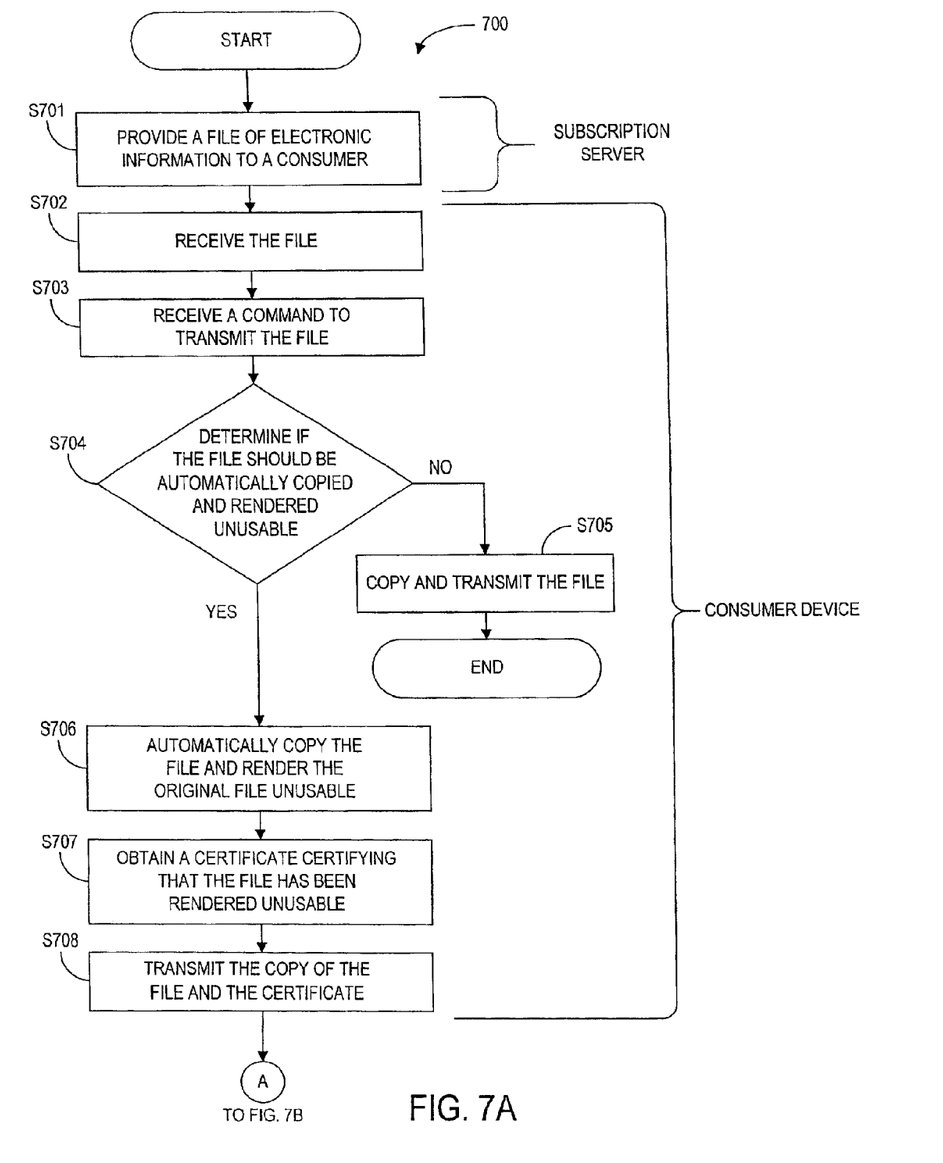
FIGS. 7A and 7B show a flow diagram of process steps to provide a file of electronic information according to embodiments of the present invention.
Figure 7B:
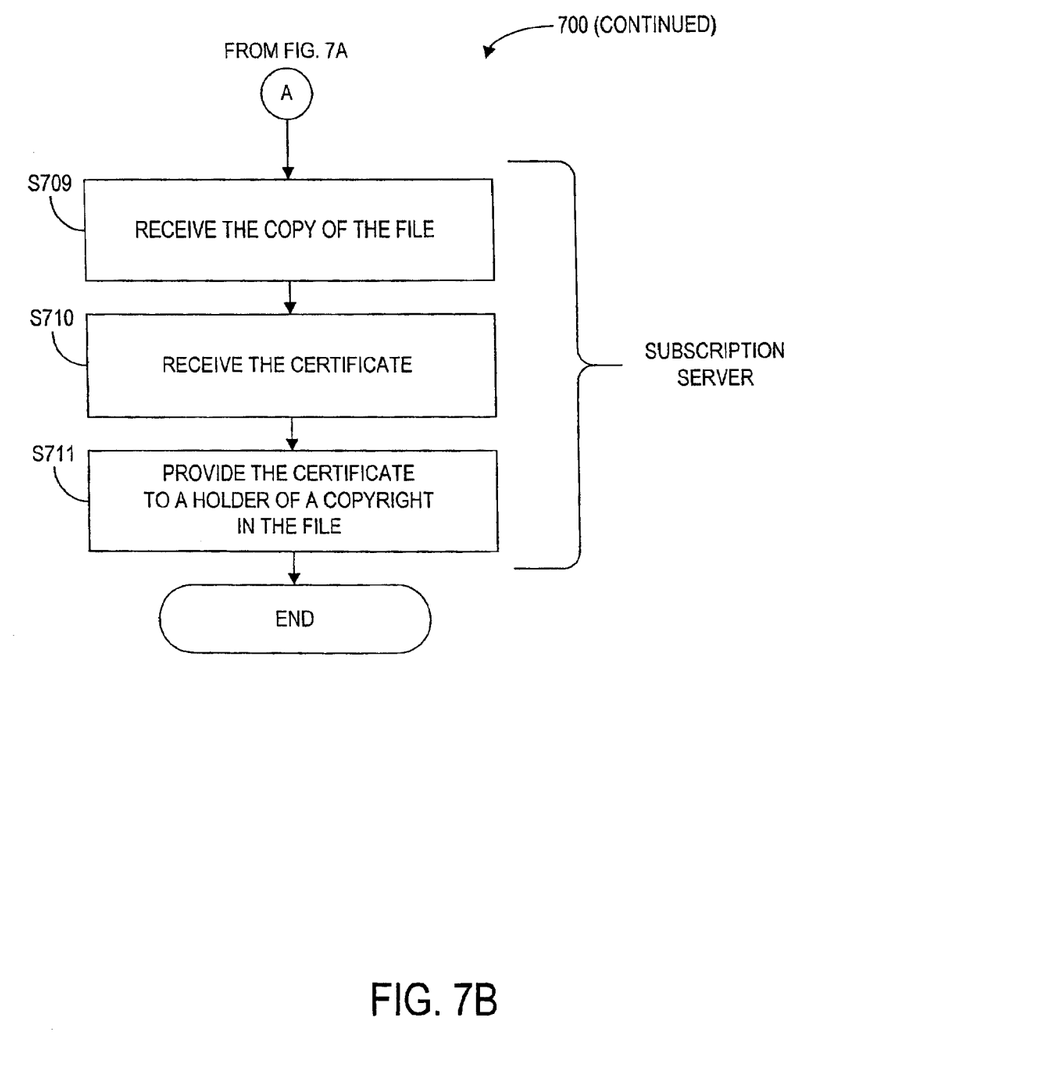

Process steps 700 of FIGS. 7A and 7B set forth a process to obtain consumer information according to an embodiment of the present invention. As illustrated, process steps 700 will be described as being partly included in subscription program 292 and executed by microprocessor 210 of subscription server 200 and partly included in consumer subscription program 492 and executed by microprocessor 410 of consumer device 400. Of course, it should be noted that process steps 700 may be performed by any device or by any number of devices in combination. Moreover, some or all of process steps 700 may be performed manually.

Process steps 700 begin at step S701, in which a file of electronic information is provided to a consumer. The file may include any electronic information, including an image, text, multimedia, a movie, audio, music, software, news, weather, sports news, and data. As described above, a file may be provided to a consumer in step S701 in accordance with a sale of the file, an unsolicited offer to sell the file, or a subscription. In one example, a consumer is identified in subscription database 296 along with an associated subscription type and delivery information. Accordingly, using the delivery information, the consumer is provided with a file in step S701 corresponding to the subscription type.

Next, in step S702, the file is received by consumer device 400. The file may be received via communication port 430 or via a medium delivered to the consumer and read using a compatible device included with consumer device 400. A command to transmit the file is received in step S703. The command may be input by the consumer using input device 440 and may comprise a command to transmit the file back to subscription server 200. It should be noted that the command may also comprise a command to transmit the file to another entity or device, such as a consumer device operated by another consumer.

After the command is received, it is determined in step S704 whether the file should be automatically copied and rendered unusable. In one embodiment of step S704, microprocessor 410 executes process steps of consumer subscription program 492 to determine whether the file includes an electronic tag, such as that included in segment 602 of file 600, indicating that the file should be automatically copied and rendered unusable. If the determination in step S704 is negative, the file is copied and the copy is transmitted in step S705.

If the determination in step S704 is affirmative, flow proceeds to step S706 to automatically copy the file and to render the original file unusable. The file may be copied using any known system for copying a file of electronic information. For example, the file may be copied in either one of steps S705 and S706 by creating an electronic mail message including the file, or by copying the file to electronic storage, magnetic storage, or optical storage. Similarly, the file may be rendered unusable using any known system, such as by erasing the file.

Next, in step S707, a certificate is obtained certifying that the original file has been rendered unusable. In one embodiment, the certificate is produced using process steps of consumer subscription program 492. These process steps may be pre-approved by a certifying authority. Additionally, the approving certifying authority may be specified by the file as illustrated by segment 603 of file 600. In other embodiments, the process steps produce a code after step S706 and transmit the code to the certifying authority through certification server 300. Certification server 300 then verifies that the code indicates that the original file has been rendered unusable and transmits a certificate to that effect to consumer device 400.

The copy of the file and the certificate are transmitted in step S708. In the present example, the copy and the certificate are transmitted to subscription server 200. Accordingly, the copy and the certificate are reflected in returned field 504 and certificate received field 505 of subscription database 296. In other embodiments, one or both of the copy and the certificate are also or alternatively transmitted to certification server 300 or to a holder of a copyright in information embodied in the file. In this regard, the file itself may specify the copyright holder as shown in segment 602 of file 600.

Subscription server 200 receives the copy of the file in step S709, and receives the certificate in step S710. Again, in other embodiments of steps S709 and S710, one or both of the copy and the certificate are also or alternatively received by certification server 300 or by a holder of a copyright in information embodied in the file. Next, in step S711, the certificate is provided to a holder of a copyright in information embodied in the file. The certificate is provided by subscription server 200 in the present example, but may be provided by any other entity storing the certificate. Of course, there is no need to perform step S711 if the certificate was provided to the copyright holder in step S711.

As previously mentioned, the foregoing steps provide a degree of protection to any copyright interest embodied in a file of electronic information.

Although the present invention has been described with respect to particular embodiments thereof, those skilled in the art will note that various substitutions may be made to those embodiments described herein without departing from the spirit and scope of the present invention.

What is claimed is:

1. A method for transferring electronic information, comprising:

receiving a command to transmit a portion of a file of electronic information; and in response to the received command to transmit the portion of the file of electronic information, automatically copying the portion of the file of electronic information to create a copied file of electronic information, transmitting the copied file to an entity, and rendering the portion of the file of electronic information unusable, wherein the rendering step comprises erasing the portion of the file of electronic information.

2. A method according to claim 1, comprising:

determining whether the portion of the file of electronic information should be automatically copied and rendered unusable.

3. A method according to claim 2, wherein the determining step is based on an electronic tag associated with the portion of the file of electronic information.

4. A method according to claim 1, further comprising:

determining that the portion of the file of electronic information has been rendered unusable; and transmitting a certificate certifying that the portion of the file of electronic information has been rendered unusable.

5. A method according to claim 4, wherein the file is received from an entity, and wherein the certificate is transmitted to the entity.

6. A method according to claim 4, wherein the certificate is transmitted to an owner of a copyright in the file of electronic information.

7. A method according to claim 1, wherein the electronic information comprises at least one of an image, text, multimedia, a movie, audio, music, software, news, weather, sports news, and data.

8. A method according to claim 1, wherein the step of automatically copying comprises at least one of creating an electronic mail message, copying to electronic storage, copying to magnetic storage, and copying to optical storage.

9. A method for providing a file of electronic information comprising:

provin a file of electronic information;

receiving a copy of a portion of the file of electronic information; and receiving a certificate certifying that the portion of the file of electronic information that has been copied has been rendered unusable, wherein the portion of the file of electronic information is erased in order to render the file unusable.

10. A method according to claim 9, wherein the file is provided to a consumer in fulfillment of a subscription.

11. A method according to claim 9, further comprising providing the certificate to an owner of a copyright in the portion of the file of electronic information.

12. A method according to claim 9, wherein the file of information comprises a tag indicating that the portion of the file should be rendered unusable if the portion of the file is copied.

13. A method according to claim 9, wherein the electronic information comprises at least one of an image, text, multimedia, a movie, audio, music, software, news, weather, sports news, and data.

14. A method according to claim 1, wherein the portion of the file of electronic information is the entire file of electronic information.

15. A method according to claim 9, wherein the portion of the file of electronic information is the entire file of electronic information.

* * * * *